United States Patent [19]

Misura

[11] Patent Number: 4,666,976
[45] Date of Patent: May 19, 1987

[54] INTERNALLY COLORED POLYOL (ALLYL CARBONATE) POLYMERIZATES

[75] Inventor: Michael S. Misura, Barberton, Ohio

[73] Assignee: PPG Industries, Inc., Pittsburgh, Pa.

[21] Appl. No.: 852,376

[22] Filed: Apr. 16, 1986

Related U.S. Application Data

[63] Continuation of Ser. No. 637,360, Dec. 28, 1984, abandoned.

[51] Int. Cl.$^4$ .................... C08K 5/13; C08K 5/46; G02B 1/04; C08F 118/00
[52] U.S. Cl. .................... 524/739; 524/83; 524/543; 524/740; 524/741; 524/743; 524/851; 524/852; 526/314
[58] Field of Search ............. 524/83, 543, 739, 740, 524/741, 743, 851, 852; 526/314

[56] References Cited

U.S. PATENT DOCUMENTS

| | | | |
|---|---|---|---|
| 2,370,565 | 2/1945 | Muskat et al. | 260/78 |
| 4,622,376 | 11/1986 | Misura et al. | 526/286 |

FOREIGN PATENT DOCUMENTS 0080339  6/1983  European Pat. Off. .

OTHER PUBLICATIONS 1982-1983 *Aldrich Catalog/Handbook of Fine Chemicals,* (1982), p. 207.
Derwent Abstract 01160A/01 (J52138144), Suwa Seikosha KK, Nov. 1977.
Derwent Abstract 00973A/01 (J52137354), Suwa Seikosha KK, Nov. 1977.
Derwent Abstract 07014A/04 (J52146252), Suwa Seikosha KK, Dec. 1977.
Derwent Abstract 05535A/03 (J52145260), Suwa Seikosha KK, Dec. 1977.
Derwent Abstract 80510E/38 (J57133106) Aug. 1982, Asahi.
Derwent Abstract 83-701922/27 (J58087377-A), May 1983, Mitsubishi.
Derwent Abstract 40817C/23 (J80017156), May 1980, Hoya Lens.
Derwent Abstract 83465A/46 (J78039910), Oct. 1978, Hoya Lens.

*Primary Examiner*—Herbert J. Lilling
*Attorney, Agent, or Firm*—George D. Morris

[57] ABSTRACT

When a solution of liquid allylic-functional material and bromoxylenol blue is polymerized using a thermally decomposable polymerization initiator, the color imparted by the bromoxylenol blue is brilliant yellow.

30 Claims, No Drawings

INTERNALLY COLORED POLYOL (ALLYL CARBONATE) POLYMERIZATES

This application is a continuation of application Ser. No. 687,360, filed Dec. 28, 1984, now abandoned.

Pourable, polymerizable compositions containing polyol (allyl carbonate) material and various initiators have been used to produce various polymeric articles, especially those such as ophthalmic lenses, face shields, and the like, which are generally transparent to at least portions of the visible spectrum. The polymerizates are typically formed by heating the polymerizable compositions to temperatures at which the initiator decomposes at a rate sufficient to initiate polymerization which then proceeds to the desired degree, which is usually substantially complete polymerization.

In many cases it is desirable to incorporate into the polymerizable compositions one or more dyes in order to produce polymerizates of various colors. Colored polymerizates have a variety of uses including tinted ophthalmic lenses, lenses for sunglasses, optical filters, welder's shields, and face masks.

Many dyes have been tried in the polymerizable compositions, but in only a very few instances have the dyes remained stable during the polymerization process. Although it is not desired to be bound by any theory, it is believed that the initiator reacts chemically with the dye during the polymerization process. Whatever the reason, the result is typically a polymerizate in which the color is severely faded or severely changed in hue or both, as compared to the color of the polymerizable composition containing the dye.

Many dyes have also been tried in an effort to produce from pourable, polymerizable compositions containing polyol(allyl carbonate) material polymerizates which are brilliant yellow in color. Several dyes tend to induce a yellow-orange or brownish yellow color to such polymerzates, but few dyes, if any at all, have been found which are sufficiently soluble in the polymerizable composition and which provide a brilliant yellow color to the polymerizate.

It has now been found that bromoxylenol blue may be employed as dye for liquid allylic functional material, and that when a solution of the liquid allylic-functional material and the dye is polymerized using a thermally decomposable polymerization initiator, the color imparted by the bromoxylenol blue remains essentially stable during the polymerization.

It has also been found that bromoxylenol blue imparts a brilliant yellow color to polymerizates of allylic-functional material.

Accordingly, one embodiment of the invention is a solution comprising (a) liquid allylic-functional material comprising polyol(allyl carbonate) monomer, liquid polyol(allyl carbonate) polymer, or a mixture thereof, and (b) bromoxylenol blue.

Another embodiment of the invention is a pourable, polymerizable composition comprising (a) liquid allylic-functional material comprising polyol(allyl carbonate) monomer, liquid polyol(allyl carbonate) polymer or a mixture thereof, (b) bromoxylenol blue and (c) thermally decomposable polymerization initiator.

A further embodiment of the invention is a method comprising heating the above-described pourable, polymerizable composition to form a polymerizate.

Yet another embodiment of the invention is the polymerizate produced by the above-described method.

Polyl(allyl carbonate) monomers which can be utilized in the practice of the present invention, are the liquid allyl carbonates of linear or branched aliphatic or aromatic polyols, e.g., aliphatic glycol bis(allyl carbonate) compounds, or alkylidene bisphenol bis(allyl carbonate) comounds. These monomers can be described as unsaturated polycarbonates of polyols, e.g., glycols. The monomers can be prepared by procedures well known in the art, e.g., U.S. Pat. Nos. 2,370,567 and 2,403,113, the entire disclosures of which are incorporated herein by reference. In the latter patent, the monomers are prepared by treating the polyol, e.g., glycol with phosgene at temperatures between 0° and 20° C. to form the corresponding polychloroformate, e.g., dichloroformate. The polychloroformate is then reacted with an unsaturated alcohol in the presence of a suitable acid acceptor, e.g., pyridine, a tertiary amine, or an alkaline or alkaline earth metal hydroxide. Alternatively, the unsaturated alcohol can be reacted with phosgene and the resulting chloroformate reacted with the polyol in the presence of an alkaline reagent, as described in U.S. Pat. No. 2,370,567.

The polyol(allyl carbonate) monomers can be represented by the graphic formula:

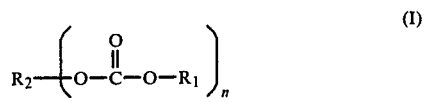

wherein $R_1$ is the radical derived from the unsaturated alcohol and is an allyl or substituted allyl group, $R_2$ is the radical derived from the polyol and the average value of n is in the range of from about 2 to about 5, preferably about 2. For any particular compound the value of n is an integer. For mixtures of compounds, however, the average value of n may be a whole or a fractional number. The average value of n is based on the number average molecular weight of the polyol(allyl carbonate) monomer species constituting the mixture. The allyl group ($R_1$) can be substituted at the 2-position with a halogen, most notably chlorine or bromine, or an alkyl group containing from 1 to 4 carbon atoms, generally a methyl or ethyl group. The $R_1$ radical can be represented by the graphic formula:

wherein $R_o$ is hydrogen, halogen, or a $C_1$–$C_4$ alkyl group. Specific examples of $R_1$ include the groups: allyl, 2-chloroallyl, 2-bromoallyl, 2-fluoroallyl, 2-methallyl, 2-ethylallyl, 2-isopropylallyl, 2-n-propylallyl, and 2-n-butylallyl. Most commonly, $R_1$ is the allyl group, $H_2C=\!CH\!-\!CH_2\!-$.

$R_2$ is a polyvalent radical derived from the polyol, which can be an aliphatic or aromatic polyol that contains 2, 3, 4, or 5 hydroxy groups. Typically, the polyol contains 2 hydroxy groups, i.e., a glycol or bisphenol. The aliphatic polyol can be linear or branched and contain from 2 to 10 carbon atoms. Commonly, the aliphatic polyol is an alkylene glycol having from 2 to 4 carbon atoms or a poly($C_2$–$C_4$)alkylene glycol, i.e., ethylene glycol, propylene glycol, trimethylene glycol, tetramethylene glycol, or diethylene glycol, triethylene glycol, etc.

One class of aromatic polyols can be represented by the graphic formula:

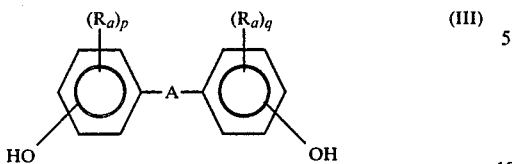

wherein A is oxy, sulfonyl, or an alkylidene radical, having from 1 to 4 carbon atoms, e.g., methylene, ethylidene, dimethylmethylene(isopropylidene), each $R_a$ independently represents a lower alkyl substituent of from 1 to 3 carbon atoms, and p and q are each independently 0, 1, 2, or 3. Preferably, the hydroxyl group is in the ortho or para position. The para position is especially preferred.

The polyols from which $R_2$ is derived may also be polyol-functional chain extended compounds. Examples of such compounds based on alkylene oxide extension include ethylene oxide extended trimethylolpropane, propylene oxide extended trimethylolpropane, ethylene oxide extended glycerol, and propylene oxide extended glycerol. Additional examples include ethylene oxide extended bisphenols such as those represented by the formula:

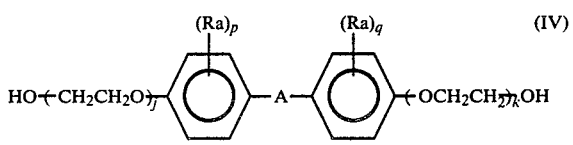

where A, Ra, p, and q are as discussed above in respect of Formula III, and j and k are each independently 1, 2, 3, or 4. Many compounds based on lactone extension are described in U.S. Pat. No. 3,169,945, the entire disclosure of which is incorporated herein by reference.

Specific examples of the radical $R_2$ include: alkylene groups containing from 2 to 10 carbon atoms such as ethylene, (—$CH_2$—$CH_2$—), trimethylene, methylethylene, tetramethylene, ethylethylene, pentamethylene, hexamethylene, 2-methylhexamethylene, octamethylene, and decamethylene; alkylene ether groups such as —$CH_2$—O—$CH_2$—, —$CH_2CH_2$—O—$CH_2CH_2$—, —$CH_2$O—$CH_2$—$CH_2$—, and —$CH_2CH_2CH_2$—O—$CH_2CH_2CH_2$—; alkylene polyether groups such as —$CH_2CH_2$—O—$CH_2CH_2$—O—$CH_2CH_2$— and —$CH_2CH_2CH_2$—O—$CH_2CH_2CH_2$—O—$CH_2CH_2CH_2$— alkylene carbonate and alkylene ether carbonate groups such as —$CH_2CH_2$—O—CO—O—$CH_2CH_2$— and —$CH_2CH_2$—O—$CH_2CH_2$—O—CO—O—$CH_2C$-$H_2$—O—$CH_2CH_2$—; and isopropylidene bis(para-phenyl), i.e.,

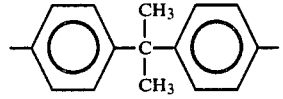

Most commonyl, $R_2$ is —$CH_2CH_2$—, —$CH_2CH_2$—O—$CH_2CH_2$—, or —$CH_2CH_2$—O—$CH_2CH_2$—O—$CH_2CH_2$—.

Specific examples of polyol (allyl carbonate) monomers useful in the practice of the invention herein contemplated include ethylene glycol bis(2-chloroallyl carbonate), ethylene glycol bis(allyl carbonate), 1,4-butanediol bis(allyl carbonate), 1,5-pentanediol bis(allyl carbonate),1,6-hexanediol bis(allyl carbonate), diethylene glycol bis(2-methallyl carbonate), diethylene glycol bis(allyl carbonate), triethylene glycol bis(allyl carbonate), propylene glycol bis(2-ethylallyl carbonate), 1,3-propanediol bis(allyl carbonate), 1,3-butanediol bis(allyl carbonate), 1,4-butanediol bis(2-bromoallyl carbonate), dipropylene glycol bis(allyl carbonate), trimethylene glycol bis(2-ethylallyl carbonate),pentamethylene glycol bis(allyl carbonate), isopropylidene bisphenol bis(allyl carbonate), oxy bisphenol bis(allyl carbonate), and sulfonyl bisphenol bis(allyl carbonate).

A preferred class of polyol (allyl carbonate) monomers is represented by the graphic formula,

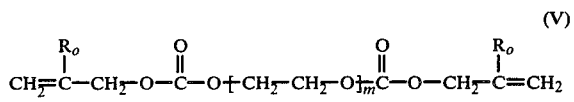

wherein $R_o$ is hydrogen, halogen or $C_1$-$C_4$ alkyl, and the average value of m is in the range of from about 1 to about 3, $R_o$ is peferably hydrogen.

Industrially important polyol bis(allyl carbonate) monomers which can be utilized in the invention herein contemplated are:

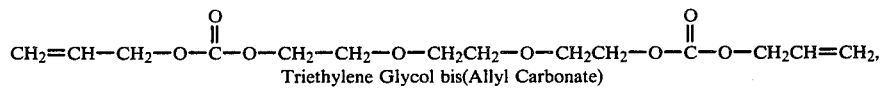
Triethylene Glycol bis(Allyl Carbonate)    (VI)

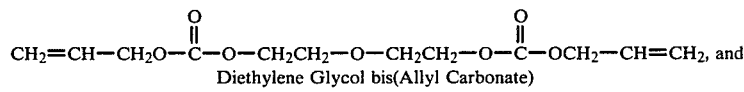
Diethylene Glycol bis(Allyl Carbonate)    (VII)

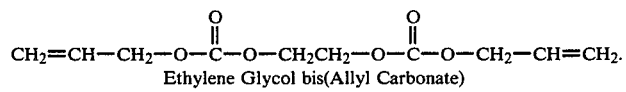
Ethylene Glycol bis(Allyl Carbonate)    (VIII)

Diethylene glycol bis(allyl carbonate) is preferred. This monomer is commercially available from PPG Industries, Inc. and is sold under the trademark CR-39 Allyl Diglycol Carbonate.

Because of the process by which the polyol(allyl carbonate) monomer is prepared, i.e., by phosgenation of the polyol(or allyl alcohol) and subsequent esterification by the allyl alcohol(or polyol), the monomer product can contain related monomer species. In the case of diol bis(allyl carbonate), individual related monomer species can be represented by either the graphic formula:

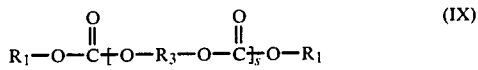

(IX)

or the graphic formula:

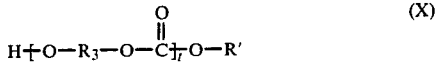

(X)

wherein Rhd 1 is as defined above the respect to graphic formula I, each $R_3$ is independently a divalent radical, derived from a diol, R' is $R_1$ or hydroxyl, s is a whole number from 2 to about 5, and t is a whole number from 1 to about 5. Individual related monomer species associated with diethylene glycol bis(allyl carbonate) can be represented by either the graphic formula:

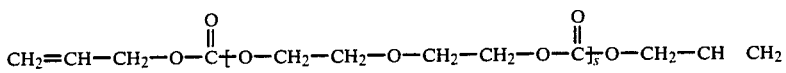

(XI)

or by the graphic formula:

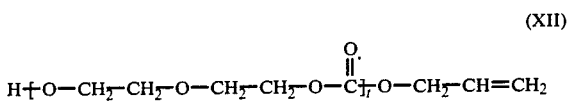

(XII)

wherein s is a whole number from 2 to about 5, and t is a whole number from 1 to about 5. Analogous principles apply when the functionality of the polyol is greater than two.

The polyol(allyl carbonate) monomer composition may be purified so as to contain essentially no related monomer species, but this is rarely done. Although the polyl(allyl carbonate) monomer composition may contain only a single related monomer species, it usually contains a mixture of different related monomer species. Typically all of the related monomer species taken together constitute from about 1 to about 20 weight percent of the polyol(allyl carbonate) monomer composition.

As used in the present description and claims, the term polyol(allyl carbonate) monomer or like names, e.g., diethylene glycol bis(allyl carbonate), are intended to mean and include the named monomer and all related monomers species which may be contained therein.

The liquid polyol(allyl carbonate) polymer which is useful in the practice of the present invention and preparation of the liquid polyl(allyl carbonate) polymer are described in detail in copending application Ser. No. 549,850, filed Nov. 9, 1983, now abandoned, the entire disclosure of which is incorporated herein by reference.

In accordance with a method of application Ser. No. 549,850, polyol(allyl carbonate) monomer is dissolved in a solvent in which the polymer produced from such monomer is also soluble. Preferably, the initiator used to conduct the polymrization is also soluble in the solvent. The resulting liquid solution comprising polyol (allyl carbonate) monomer, solvent and preferably initiator is then partially polymerized, e.g., by heating the liquid solution to polymerization temperatures. The polymerization reaction is allowed to continue until from 15 to 50 percent allylic utilization is attained, i.e., until from 15 to 50 percent of the unsaturated carbon—carbon linkages in the monomer are consumed. The degree of allylic utilization can be controlled by regulating the amount of initiator added to the liquid solution, the temperature at which the partial polymerization is performed, and the ratio of solvent to polyol(allyl carbonate). Generally, the greater the amount of initiator used, the higher is the allylic utilization. The higher the temperature of polymerization, the lower is the degree of allylic utilization. At constant temperature and employing a given amount of initiator, the higher the ratio of solvent to monomer, the lower is the degree of allylic utilization. Ordinarily however, if at constant temperature the ratio of solvent to monomer is increased and the amount of initiator employed is also sufficiently increased, the reaction can be driven to a higher degree of allylic utilization without the formation of gel than in a system containing less solvent.

In a preferred embodiment of application Ser. No. 549,850, from about 0.1 to about 1.5 weight percent of initiator, basis the amount of monomer, from about 0.5 to 5 milliliters of solvent per gram of monomer, and polymerization temperatures of from 28° C. to about 100° C. are used. The degree of allylic utilization can be monitored by nuclear magnetic resonance (NMR) and infrared (IR) spectroscopy. The solvent in the resulting composition can be removed by known techniques, e.g., by evaporation or distillation, leaving a viscous liquid comprising a solution of partially polymerized polyl(allyl carbonate) in polyol(allyl carbonate) monomer. This liquid product is for convenience, referred to herein as "liquid polyol(allyl carbonate) polymer".

The liquid polyol(allyl carbonate) polymer is typically a pourable, syrupy liquid having a kinematic viscosity (measured with a capillary viscometer) of from at least about 100 centistokes to about 100,000 centistokes, typically from about 1000 to 40,000 centistokes, more typically from about 500 to 2,000 centistokes, measured at 25° C., and a bulk density at 25° C. of from about 1.17 to about 1.23 grams per cubic centimeter. The liquid polyol(allyl carbonate) polymer is further characterized by having more than 12 percent allylic utilization, preferably from at least 15 to 50 percent allylic utilization, and, in a particularly preferred exemplification, from about 20 to 50 percent allylic utilization, as determined by IR or NMR analysis. IR analysis is preferred.

Organic solvents useful in carrying out the solution polymerization are those which are non-reactive chemically with the monomer and resulting polymer, have a boiling temperature substantially below the monomer, i.e., a higher vapor pressure, so as to be easily separated from the monomer by distillation, and which serve as a solvent for the polyol(allyl carbonate) monomer and the resulting liquid polyol(allyl carbonate) polymer (and preferably also the initiator). Useful solvents include the halogenated, e.g., chlorinated, $C_1$–$C_2$ hydrocarbon solvents, i.e., methyl chloride, methylene chloride, ethyl chloride, ethylene dichloride, 1,1,2-trichloro-1,2,2-trifluoroethane, and mixtures thereof. Methylene chloride is preferred because of its high vapor pressure, low boiling point, ease of separation, and relatively low toxicity.

The amount of solvent used in the partial polymerization process should be sufficient to solubilize all of the monomer and to maintain all of the resulting polymer in solution. This is generally from about 0.5 to 5 milliliters of solvent per gram of monomer. Greater amounts of solvent can be used without deleterious effect. Lesser amounts of solvent result in the formation of an insoluble, infusible intractable gel.

The concentration of initiator useful for the partial polymerization should be sufficient to result in the desired degree of allylic utilization at the conditions used, and generally can vary from 0.1 to about 1.5 weight percent initiator, basis weight of monomer. Greater amounts of initiator may result in either residual initiator in the liquid polyol(allyl carbonate) polymer or formation of an infusible, insoluble, intractable gel. The initiators useful in carrying out the solution polymerization of the polyol(allyl carbonate) monomer are free radicl initiators, e.g., organic peroxides and azo catalysts, and are well known in the art. The preferred free radical initiators are organic peroxy compounds, such as peroxyesters, diacyl peroxides peroxydicarbonates and mixtures of such peroxy compounds.

Examples of peroxy compounds include: peroxydicarbonate esters such as di(n-propyl)-, diisopropyl-, di(n-butyl)-, di(secondary butyl)-, diisobutyl-, di(2-ethylhexyl)-, dicetyl-, dicyclohexyl- and di(4-tertiarybutyl cyclohexyl) peroxydicarbonate; diacyl peroxides such as diacetyl-, dibenzoyl-, dilauroyl-, and diisobutyryl peroxide; and peroxyesters such as tertiary-butyl perpivalate, tertiary-butyl peroctoate and tertiarybutyl perneodecanoate.

The solution polymerization is generally carried out at temperatures of from about 28° C. to about 100° C., for from about 1 to about 24 hours. The time and temperature depend on the initiator and the concentration thereof, and the solvent:monomer ratio used. For the polymerization of diethylene glycol bis(allyl carbonate) in methylene chloride at a solvent:monomer ratio of 1:1 v/w, with 0.1 to 1.0 weight percent diisopropyl peroxydicarbonate, basis weight of diethylene glycol bis(allyl carbonate), the time required to obtain the high viscosity, syrupy polymer contemplated is from about 6 to about 18 hours at 60° C.

According to one exemplification, a liquid mixture comprising 100 grams of diethylene glycol bis(allyl carbonate), 300 milliliters of methylene chloride and 1.1 milliliters of diisopropyl peroxydicarbonate was prepared. The liquid mixture was placed in a bottle and the bottle was purged with argon for 3 minutes. The bottle and its contents were held at 70° C. for 18 hours and then cooled to 25° C. The liquid reaction mixture was placed in a one-liter round bottom flask and vacuum stripped at 50° C. for 2 hours. Then the temperature was raised to 60° C. for 1 hour and the pressure lowered until an absolute pressure of 267 pascals was obtained. The residue (viz., liquid polyol(allyl carbonate) polymer) remaining after vacuum stripping was a liquid having a viscosity of 1900 centipoises and an allyl utilization of 34 percent.

Although it is not desired to be bound by any theory, it is believed that bromoxylenol blue has tautomeric structures in which the heterocyclic ring may be considered closed or open. Irrespective of whether the heterocyclic ring is closed or open in the compositions of the present invention, it is preferred for chemical nomenclature purposes that bromoxylenol blue be named in closed form. Closed-form names of bromoxylenol blue are 3',3''-dibromo-2',2'',5',5''-tetramethylphenolsulfonephthalein and 2,2'-dibromo-3,3',6,6'-tetramethyl-4,4'-(3H-2,1-benzoxathiol-3-ylidene)bisphenol,S,S-dioxide.

The initiators used in the present invention may be widely varied, but in general they are thermally decomposable to produce radical pains. One or both members of the radical pair are available to initiate addition polymerization of allylic groups (and acrylic groups when present in the well-known manner.

The preferred initiators are peroxy initiators. Examples of suitable peroxy initiators include those represented by any of the following formulae:

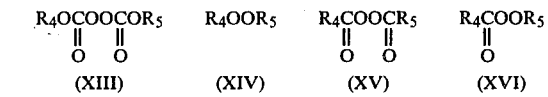

wherein $R_4$ and $R_5$ are each individually phenyl, phenylalkyl in which the alkyl portion is straight or branched and contains from 1 to about 10 carbon atoms, straight alkyl containing from 1 to about 20 carbon atoms, branched alkyl containing from 3 to about 20 carbon atoms, cycloalkyl containing from about 6 to about 12 carbon atoms, or polycycloalkyl containing from about 7 to about 12 carbon atoms. The specific groups used for $R_4$ and $R_5$ may be the same or they may be different.

It is to be understood that unless otherwise qualified, either expressly or contextually, any of the above groups may be substituted with one or more minor substituents so long as their numbers and identities do not render the initiator unsuitable for its intended purpose. Halo groups, alkoxy groups containing from 1 to about 4 carbon atoms, haloalkyl groups containing from 1 to about 4 carbon atoms, and polyhaloalkyl groups containing from 1 to about 4 carbon atoms are examples of substituents which may be used. Alkyl groups containing from 1 to about 4 carbon atoms may be used as substituents on non-aliphatic groups or on non-aliphatic portions of complex groups.

The phenylalkyl groups used for $R_4$, $R_5$, or both $R_4$ and $R_5$ often contain from 1 to about 4 carbon atoms in the alkyl portion. Benzyl and phenylethyl are preferred.

The branched alkyl groups often have at least one branch in the 1-position or the 2-position. In many cases each branched alkyl group contains from 3 to about 8 carbon atoms. Preferably, each branched alkyl group contains 3 or 5 carbon atoms.

Examples of branched alkyl groups that may be used include isopropyl secondary butyl, isobutyl, tertiary butyl, 1-methylbutyl, 2-methylbutyl, tertiary pentyl, 1,2-dimethylpropyl, neopentyl, 1-methylpentyl, 2-methylpentyl, 1,1-dimethylbutyl, 1,2-dimethylbutyl, 1,3-dimethylbutyl, 2,2-dimethylbutyl, 1-ethylbutyl, 2-ethylbutyl, 2-ethylhexyl, 2,4,4-trimethylpentyl, and 1-ethyldecyl. Preferred are secondary butyl, tertiary butyl, and neopentyl.

The cycloalkyl often contains from about 6 to about 8 carbon atoms.

Examples of cycloalkyl groups include cyclohexyl, cycloheptyl cyclooctyl, cyclodecyl, and cyclododecyl. Cyclohexyl is preferred.

The polycycloalkyl typically contains from about 7 to about 10 carbon atoms.

Examples of polycycloalkyl groups that may be used include 1-norbornyl, 2-bornyl, and 1-adamantyl.

Exemplary peroxy initiators include those described above in respect of the preparation of liquid polyol(allyl carbonate) polymer. Diisopropyl peroxydicarbonate and benzoyl peroxide are the preferred initiators.

Other examples of suitable peroxy initiators include monoperoxycarbonates represented by the following formula:

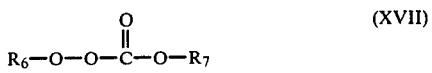
(XVII)

wherein $R_6$ is a tertiary $C_4$–$C_5$ alkyl, e.g., tertiary butyl and tertiary amyl, and $R_7$ is a $C_3$–$C_7$ alkyl. Examples of alkyl radicals representative of $R_7$ include: isopropyl, n-propyl, isobutyl, secondary butyl, n-butyl, secondary amyl, isoamyl, n-amyl, secondary hexyl, isohexyl, n-hexyl, n-heptyl and 2,4-dimethyl-3-pentyl. Preferred as $R_7$ are secondary $C_3$–$C_7$ alkyls such as isopropyl, secondary butyl, and 2,4-dimethyl-3-pentyl. Particularly preferred monoperoxycarbonates are tertiary-butylperoxy isopropyl carbonate and tertiary-amylperoxy isopropyl carbonate.

The amount of initiator present in the polymerizable composition may be widely varied. Ordinarily the weight ratio of the initiator to the liquid allylic-functional material is in the range of from about 0.5:100 to about 10:100. In many cases the weight ratio is in the range of from about 2:100 to about 8:100. A weight ratio in the range of from about 3:100 to about 7:100 is preferred.

The amount of bromoxylenol blue present in the composition may also be widely varied. Typically the weight ratio of the bromoxylenol blue to the liquid allylic-functional material is in the range of from about 0.01:100 to about 1:100. In many cases the weight ratio is in the range of from about 0.05:100 to about 0.8:100. A weight ratio in the range of from about 0.1:100 to about 0.5:100 is preferred.

There are many materials which may optionally be present in the pourable, polymerizable composition. Among these are acrylate additives which may be polyfunctional acrylic monomer and/or monofunctional acrylic monomer.

The polyfunctional acrylate monomers useful as the acrylate additive include those represented by the graphic formula:

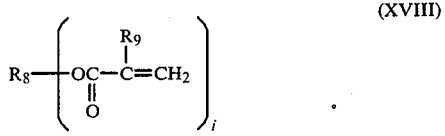
(XVIII)

which is the ester of the polyol, $R_8(OH)_i$, and an acrylic acid which may be alpha-unsubstituted or alpha-substituted, such as

(XIX)

wherein $R_9$ is hydrogen, halogen, or a $C_1$–$C_4$ alkyl group; $R_8$ is the organic residue of the aliphatic polyol, which typically contains from 1 to 12, more typically 2 to 6, carbon atoms, and i is a whole number from 2 to 5, more usually 2 to 3.

In most cases $R_9$ is hydrogen, methyl, or ethyl; hydrogen or methyl is preferred. $R_8(OH)_i$ can be a diol, a triol, a tetracarbinol, or a pentacarbinol. Most commonly $R_8(OH)_i$ is a diol or triol. Typical diols useful in providing esters with terminal diacrylate functionality include: alpha, omega-glycols such as ethylene glycol, trimethylene glycol, 1,4-butanediol, 1,5-pentane diol and 1,6-hexanediol, other 1,2-glycols, such as propylene glycol, the hydrated ethylene oxide and propylene condensation products, such as diethylene glycol, triethylene glycol, tetraethylene glycol, dipropylene glycol, tripropylene glycol, tetrapropylene glycol, and the like.

Preferably the polyfunctional acrylate monomers are the di- or the triacrylates, more preferably the diacrylates.

Suitable triacrylates include trimethylolpropane triacrylate, trimethylolpropane trimethacrylate, glycerol triacrylate, glycerol trimethacrylate, pentaerythritol triacrylate, and pentaerythritol trimethacrylate. Suitable tetraacrylates include pentaerythritol tetraacrylate and pentaerythritol tetramethacrylate.

Difunctional acrylate monomers are the preferred polyfunctional acrylate monomers. Especially preferred are the diacrylates and dimethacrylates of aliphatic diols. Examples of such diacrylates and dimethacrylates are those represented by the graphic formulae:

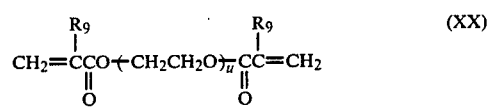
(XX)

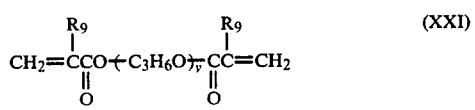
(XXI)

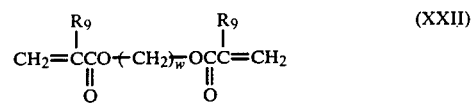
(XXII)

where for any particular compound each $R_9$ is individually hydrogen or methyl, u is a whole number from 1 to 4, v is a whole number from 1 to 4 when ($C_3H_6O$) is

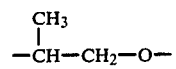

and a whole number from 1 to 3 when ($C_3H_6O$) is —$CH_2CH_2CH_2O$—; and w is a whole number from 1 to 12.

Examples of diacrylates include ethylene glycol diacrylate, ethylene glycol dimethacrylate, diethylene glycol diacrylate, diethylene glycol dimethacrylate, triethylene glycol diacrylate, triethylene glycol dimethacrylate, tetraethylene glycol diacrylate, tetraethylene glycol dimethacrylate, trimethylene glycol diacrylate, trimethylene glycol dimethacrylate, butanediol diacrylate, butanediol dimethacrylate, pentanediol diacrylate, pentanediol dimethacrylate, hexanediol diacrylate, hexanediol dimethacrylate, propylene glycol diacrylate, propylene glycol dimethacrylate, dipropylene glycol diacrylate, dipropylene glycol dimethacrylate, tripropylene glycol diacrylate, tripropylene glycol dimethacrylate, tetrapropylene glycol diacrylate, tetrapropylene glycol dimethacrylate, and the like.

Monofunctional acrylates that can be used in the present invention are typically chosen from the group consisting of $C_1$ to $C_4$, preferably $C_1$-$C_2$ alkyl, and $C_5$-$C_6$ cycloalkyl, preferably cyclohexyl, esters of the acrylic type acid of graphic formula XIX, most notably, acrylic acid, methacrylic acid and 2-methylenebutyric acid. Examples of monofunctional acrylates include: methyl acrylate, methyl methacrylate, ethyl methacrylate, butyl methacrylate, isobutyl methacrylate, and cyclohexyl methacrylate. The methacrylic acid esters, e.g., methyl methacrylate, are preferred.

The acrylate additive may comprise only one acrylate compound or it may comprise a plurality of acrylate compounds.

The amount of acrylate additive present in the polymerizable composition may vary widely. When it is used, it is often present in the range of from about 5 to about 20 percent by weight of the liquid allylic-functional material. Frequently, it is present in the range of from about 5 to about 10 percent by weight of the liquid allylic-functional material. However, the amount of the acrylic additive should be low enough that the optical and physical properties of the solid article produced polymerizing the polymerizable composition, such as refractive index and abrasion resistance, are substantially the same as those of a polymerizate prepared from a corresponding polymerizable composition without the acrylate additive.

One or more unsaturated, non-acrylic monomers may optionally be present in the polymerizable composition of the invention. These are often chosen from the group consisting of $C_1$-$C_4$ alkyl esters of unsaturated dicarboxylic acids, vinyl esters of $C_1$ to $C_3$ saturated monocarboxylic acids and styrene. The unsaturated, non-acrylic monomers, when used, are often present in amounts of from 5 to 20, e.g., 5 to 10, weight percent, basis the liquid allylic-functional material. Examples of such monomers include: $C_1$-$C_2$ alkyl esters of unsaturated $C_4$-$C_6$ dicarboxylic acids. As the unsaturated dicarboxylic acid, there can be mentioned maleic, fumaric, itaconic, citraconic, ethylmaleic and mesaconic acids. Alcohols used to prepare the esters of the mono- and dicarboxylic acids include $C_1$-$C_4$ alkanols, e.g., methanol, ethanol, propanol, isopropanol, the butanols cyclopentanol and cyclohexanol.

Vinyl esters of lower members of monocarboxylic acids can also be used as the unsaturated, non-acrylic monomer. In particular, there are contemplated the vinyl esters of $C_1$-$C_3$ saturated monocarboxylic acids, e.g., formic, acetic and propionic acids, such as vinyl acetate.

Examples of unsaturated, non-acrylic monomers contemplated herein include: dimethyl maleate, diethyl maleate, methyl ethyl maleate, dimethyl fumarate, diethyl fumarate, methyl ethyl fumarate, vinyl acetate, vinyl formate, vinyl propionate, styrene, etc. Dimethyl maleate and dimethyl fumarate are preferred.

One or more allylic-functional materials which are not polyol(allyl carbonate) compounds (hereinafter referred to as allylic additive), may optionally be present. These include monoallylic-functional allylic additives such as for example, allylbenzene, allylcyclopentane, and allylic esters of lower monocarboxylic acids, especially the saturated monocarboxylic acids. Also included are polyallylic-functional allylic additives such as triallyl isocyanurate and polyallylic functional esters of polycarboxylic acids, especially diallylic-functional esters of dicarboxylic acids; ordinarily such acids are saturated but they may be unsaturated. The amount of allylic additive present in the polymerizable composition may vary widely. When it is used, it ordinarily constitutes from about 1 to about 20 percent by weight of the allylic-functional material present.

Another material which may optionally be present in the pourable, polymerizable composition is mold release agent. When used, the mold release agent is employed in the polymerizable composition in amounts sufficient to ensure an intact, that is, unbroken and uncracked, casting which releases easily from the mold. The mold release agent should be compatible with the pourable, polymerizable composition and not adversely affect the physical properties of the casting. More particularly, the mold release agent should not adversely affect the physical properties most characteristic of the polymerizate such as its rigidity, hardness, index of optical refraction, transmission of visible light and absence of coloring which affects optical clarity. The mold release agent should, therefore, be a liquid or, if a solid, be soluble in the polymerizable composition.

Mold release agents that may be used include alkyl phosphates and stearates. Among the alkyl phosphates that may be used as a mold release agent are the mono and dialkyl phosphates (and mixtures of mono and dialkyl phosphates) which are commercially available from E. I. du Pont de Nemours & Company under the trade names ORTHOLEUM ® 162 and ZELEC ® UN. These alkyl phosphates are reported to have straight chain alkyl groups of from 16 to 18 carbon atoms.

Other mold release agents that may be used include stearic acid and the metal salts of stearic acid, e.g., stearic acid salts of the metals zinc, calcium, lead, magnesium, barium, cadmium, aluminum, and lithium. Other fatty acids and fatty acids salts may also be used, provided that they do not adversely effect the physical properties of the casting.

When used, the mold release agent is ordinarily present in the pourable, polymerizable composition in an amount between about 1 and about 2000 parts by weight of mold release agent per million parts by weight of the liquid allylic-functional material (PPM). In many cases, between about 20 and about 200 PPM is used. Between about 25 and about 100 PPM is preferred.

It will be appreciated that the proportions of the bromoxylenol blue and the optional materials and their proportions discussed above in respect of the pourable, polymerizable composition are also applicable to the solution of the bromoxylenol blue in the liquid allylic-functional material.

When the dye consists essentially of only bromoxylenol blue the solution of the dye in the liquid allylic-functional material, the pourable, polymerizable composition, and the resulting polymerizate are all yellow. Indeed yellow polymerizates and their preparation are preferred embodiments of the invention. However, one or more additional dyes may also be incorporated into the solution and/or the polymerizable composition to form a polymerizate of a color which varies from yellow. The amounts of such optional dye is highly variable and depends upon the effect desired.

The listing of optional ingredients discussed above is by no means exhaustive. These and other ingredients may be employed in their customary amounts for their customary purposes so long as they do not seriously interfere with good polymer formulating practice.

The polymerizable compositions of the invention are usually prepared by admixing the various ingredients. Mixing may be accompanied with heating when it is desirable to hasten dissolution of the bromoxylenol blue or other materials. However, if initiator is present during heating, the temperature should ordinarily be maintained below that at which polymerization is initiated. It is preferred to heat the bromoxylenol blue with all or a portion of the allylic-functional material in the absence of initiator, to cool the resulting solution, and then to introduce the initiator and other ingredients which enter the solution without undue difficulty.

The pourable, polymerizable compositions of the invention can be polymerized (viz., cured) by the known conventional techniques for polymerizing polyol (allyl carbonate) containing compositions to form solid, crosslinked polymer.

In general, polymerization is accomplished by heating the polymerizable composition to elevated temperatures. Typically polymerization is conducted at temperatures in the range of from about 28° C. to about 100° C. In many cases post curing, that is, heating beyond the time thought necessary to substantially fully polymerize the composition is employed. The post cure is often carried out above about 100° C., but below the temperatures at which thermal degredation provides undesirable yellowness, e.g., about 125° C., and preferably for a time sufficient to attain either substantially constant or maximum Barcol hardness. For example, when the cure cycle shown in Table 1 below is followed, the polymerizate may be maintained at 100° for an additional 1 to 4 hours or more. Although not wishing to be bound by any theory, the additional 1 to 4 hours of post cure is believed to decompose, primarily by initiation and chain termination, from 83 percent to 99.9 percent of the peroxide initiator remaining unreacted at the end of the normal 18 hour cure cycle. Moreover, the additional 1 to 4 hours of cure often increases the Barcol Hardness by about 5 to 8 units.

TABLE 1

Time-Temperature Sequence For Benzoyl Peroxide Cure

| Cumulative Hours | Oven Temperature, °C. |
|---|---|
| 0 | 63 |
| 2 | 63 |
| 4 | 65 |
| 6 | 67 |
| 8 | 77 |
| 10 | 80 |
| 12 | 85 |
| 14 | 88 |
| 16 | 92 |
| 18 | 100 |

In most cases, the pourable, polymerizable composition is conformed to the shape of the final solid polymerized article before polymerization. For example, the composition can be poured onto a flat surface and heated, whereby to effect polymerization and form a flat sheet or coating. According to a still further exemplification, the polymerizable composition is placed in molds as for instance glass molds, and the molds heated to effect polymerization, thereby forming shaped articles such as lens blanks or ophthalmic lenses. In a particularly preferred embodiment, the composition is poured into a lens mold and polymerized therein to produce an ophthalmic lens.

The invention is further described in conjunction with the following example which is to be considered illustrative rather than limiting.

In the example, fifteen second Barcol hardness was determined in accordance with ASTM Test Method D 2583-81 using a Barcol Impressor, luminous transmission and haze values were determined in accordance with ASTM Test Method D 1003-61 (Reapproved 1967) using a Hunterlab Tristimulus Colorimeter Model D25P-2 employing a collimated Illuminant C standard light source, and 1931 CIE Standard Tristimulus values were determined using the above identified colorimeter in accordance with the accompanying instruction manual. Chromaticity coordinates were calculated from the observed 1931 CIE Standard Tristimulus values as follows:

$$x = \frac{X}{X + Y + Z}, y = \frac{Y}{X + Y + Z}$$

EXAMPLE

Approximately 0.2 to 0.3 part by weight of bromoxylenol blue was dissolved in 100 parts by weight of diethylene glycol bis(allyl carbonate) monomer. The resulting solution had a very dark brilliant yellow color. A pourable, polymerizable composition was formed by admixing the above solution and 0.035 parts by weight of diisopropyl peroxydicarbonate. The polymerizable composition was poured into a glass mold constructed of two glass plates separated by a U-shaped pliable gasket that was 3.18 millimeters thick. The glass mold was held together by means of large binder clips. After filling the mold with the polymerizable composition, it was placed in a hot air oven and exposed to the Standard Cure Cycle for Diisopropyl peroxydicarbonate shown in Table 2.

TABLE 2

Standard Cure Cycle for Diisopropyl Peroxydicarbonate

| Cumulative Hours | Oven Temperature, °C. |
|---|---|
| 0 | 44 |
| 2 | 46 |
| 4 | 48 |
| 6 | 50 |
| 8 | 54 |
| 10 | 58 |
| 12 | 64 |
| 14 | 69 |
| 16 | 85 |
| 17 | 107 (End of Cycle) |

When the cure cycle was completed, the mold was removed from the oven and allowed to cool to room temperature. The casting, which measured about 15 centimeters × about 15 centimeters by about 3.18 millimeters was removed from the mold and was visually observed to be brilliant yellow in color. The results of physical and optical testing of the casting are shown in Table 3.

TABLE 3

| | |
|---|---|
| Luminous Transmission, percent | 82.7 |
| Haze, percent | 0.9 |
| 15 Second Barcol Hardness | 21 |
| 1931 CIE Standard Tristimulus Values | |
| X | 73.2 |
| Y | 82.9 |
| Z | 26.5 |
| Chromaticity Coordinates | |
| x | 0.401 |
| y | 0.454 |

Although the present invention has been described with reference to specific details of certain embodiments thereof, it is not intended that such details should be regarded as limitations upon the scope of the inven-

I claim:
1. A solution comprising:
   (a) liquid allylic-functional material comprising polyol (allyl carbonate) monomer, liquid polyol(allyl carbonate) polymer, or a mixture thereof, and
   (b) bromoxylenol blue.
2. The solution of claim 1 wherein said liquid allylic-functional material is polyol(allyl carbonate) monomer which is represented by the formula

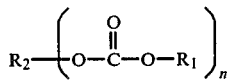

wherein $R_1$ is allyl or substituted allyl, $R_2$ is a polyvalent radical derived from said polyol, and the average value of n is in the range of from about 2 to about 5.

3. The solution of claim 2 wherein said polyol (allyl carbonate) monomer is diethylene glycol bis(allyl carbonate) monomer.
4. The solution of claim 1 wherein the weight ratio of said bromoxylenol blue to said liquid allylic-functional material is in the range of from about 0.01:100 to about 1:100.
5. A pourable, polymerizable composition comprising:
   (a) liquid allylic-functional material comprising polyol(allyl carbonate) monomer, liquid polyol(allyl carbonate) polymer, or a mixture thereof,
   (b) bromoxylenol blue, and
   (c) thermally decomposable polymerization initiator.
6. The pourable, polymerizable composition of claim 5 wherein said liquid allylic-functional material is polyol (allyl carbonate) monomer.
7. The pourable, polymerizable composition of claim 6 wherein said polyol (allyl carbonate) monomer is represented by the formula

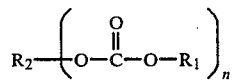

wherein $R_1$ is allyl or substituted allyl, $R_2$ is a polyvalent radical derived from said polyol, and the average value of n is in the range of from about 2 to about 5.

8. The pourable, polymerizable composition of claim 6 wherein said polyol(allyl carbonate) monomer is represented by the graphic formula:

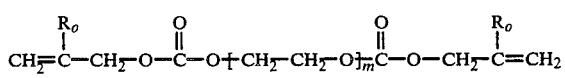

wherein $R_o$ is hydrogen, halogen or $C_1$-$C_4$ alkyl, and the average value of m is in the range of from about 1 to about 3.

9. The pourable, polymerizable composition of claim 6 wherein said polyol(allyl carbonate) monomer is diethylene glycol bis(allyl carbonate) monomer.
10. The pourable, polymerizable composition of claim 5 wherein said thermally decomposable polymerization initiator is peroxy initiator.

11. The pourable, polymerizable composition of claim 10 wherein said peroxy initiator is represented by any of the following formulae:

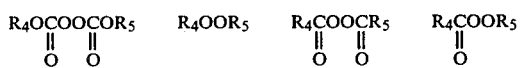

wherein $R_4$ and $R_5$ are each individually phenyl, phenylalkyl in which the alkyl portion is straight or branched and contains from 1 to about 10 carbon atoms, straight alkyl containing from 1 to about 20 carbon atoms, branched alkyl containing from 3 to about 20 carbon atoms, cycloalkyl containing from about 6 to about 12 carbon atoms, or polycycloalkyl containing from about 7 to about 12 carbon atoms.

12. The pourable, polymerizable composition of claim 10 wherein said peroxy initiator is diisopropyl peroxydicarbonate or benzoyl peroxide.
13. The pourable, polymerizable composition of claim 5 wherein the weight ratio of said bromoxylenol blue to said liquid allylic-functional material is in the range of from about 0.01:100 to about 1:100.
14. The pourable, polymerizable composition of claim 5 wherein the weight ratio of said initiator to said liquid allylic-functional material is in the range of from about 0.5:100 to about 10:100.
15. A method comprising heating a pourable, polymerizable composition comprising:
   (a) liquid allylic-functional material comprising polyol(allyl carbonate) monomer, liquid polyol(allyl carbonate) polymer, or a mixture thereof,
   (b) bromoxylenol blue, and
   (c) thermally decomposable polymerization initiator, to form a polymerizate.
16. The method of claim 15 wherein said liquid allylic-functional material is polyol(allyl carbonate) monomer.
17. The method of claim 16 wherein said polyol (allyl carbonate) monomer is represented by the graphic formula:

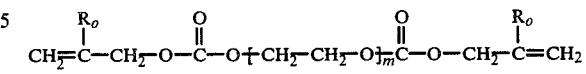

wherein $R_o$ is hydrogen, halogen or $C_1$-$C_4$ alkyl, and the average value of m is in the range of from about 1 to about 3.

18. The method of claim 16 wherein said polyol(allyl carbonate) monomer is diethylene glycol bis(allyl carbonate) monomer.
19. The method of claim 15 wherein said thermally decomposable polymerization initiator is peroxy initiator.
20. The method of claim 19 wherein said peroxy initiator is diisopropyl peroxydicarbonate or benzoyl peroxide.
21. The polymerizate produced by the method of claim 15.
22. The polymerizate produced by the method of claim 16.
23. The polymerizate produced by the method of claim 17.
24. The polymerizate produced by the method of claim 18.

25. The polymerizate produced by the method of claim 19.

26. The polymerizate produced by the method of claim 20.

27. The solution of claim 1 wherein the color of said solution is brilliant yellow.

28. The pourable, polymerizable composition of claim 5 in which the color of said composition is brilliant yellow.

29. The method of claim 15 wherein the color of said polymerizate is brilliant yellow.

30. The brilliant yellow polymerizate produced by the method of claim 29.

* * * * *